United States Patent [19]

Satoh et al.

[11] Patent Number: 5,713,992

[45] Date of Patent: Feb. 3, 1998

[54] RECORDING LIQUID

[75] Inventors: Nobuyoshi Satoh, Nagano; Takashi Hirasa; Yukichi Murata, both of Kanagawa, all of Japan

[73] Assignee: Mitsubishi Chemical Corporation, Tokyo, Japan

[21] Appl. No.: 732,451

[22] PCT Filed: Mar. 2, 1995

[86] PCT No.: PCT/JP95/00336

§ 371 Date: Jan. 13, 1997

§ 102(e) Date: Jan. 13, 1997

[87] PCT Pub. No.: WO96/26985

PCT Pub. Date: Sep. 6, 1996

[51] Int. Cl.$^6$ .................................................. C09D 11/02
[52] U.S. Cl. ................................. 106/31.48; 534/803
[58] Field of Search ........................ 106/22 K, 31.48; 534/803

[56] References Cited

U.S. PATENT DOCUMENTS 4,631,085  12/1986  Kawanishi et al. ..................... 106/22 K

FOREIGN PATENT DOCUMENTS

| 0239847 | 10/1987 | European Pat. Off. | 534/803 |
| 2814802 | 10/1978 | Germany | 534/803 |
| 279671 | 10/1992 | Japan . | |
| 16021 | 7/1994 | WIPO . | |

*Primary Examiner*—Helene Klemanski
*Attorney, Agent, or Firm*—Sughrue, Mion, Zinn, Macpeak & Seas, PLLC

[57] ABSTRACT

The present invention relates to a recording liquid characterized by comprising an aqueous medium and at least one monoazo dye selected from dyes, the free acid forms of which are represented by general formula {I}:

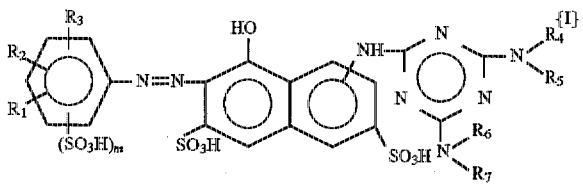

(wherein $R_1$, $R_2$, and $R_3$ each independently represents a substituted or unsubstituted alkyl group having 1 to 9 carbon atoms, an alkoxy group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic ester group, a sulfonyl group, a COOH group, or a carboxylic ester group;

m represents a number of 0, 1, or 2; and $R_4$, $R_5$, $R_6$, and $R_7$ each independently represents a hydrogen atom, an alkyl group having 1 to 18 carbon atoms, an alkenyl group having 1 to 18 carbon atoms, an aryl group, an aralkyl group, an alicyclic group, or a heterocyclic group, and each may have a substituent when not representing a hydrogen atom, provided that at least one of $R_4$, $R_5$, $R_6$, and $R_7$ represents a group having a COOH group as a substituent).

17 Claims, No Drawings

RECORDING LIQUID

TECHNICAL FIELD

The present invention relates to a recording liquid. More particularly, the present invention relates to a magenta recording liquid which is suitable for ink-jet recording and gives printed characters having especially high water resistance.

BACKGROUND ART

The so-called ink-jet recording method has come into practical use in which droplets of a recording liquid containing a water-soluble dye, e.g., a direct dye or an acid dye, are issued from a minute ejection orifice to conduct recording.

With respect to the recording liquid, it is required to rapidly fix to recording paper for general business use, e.g., paper for electrophotography or other PPCs (plain-paper copiers) and fanfold paper (continuous paper for computers, etc.), to give a print in which the printed characters are of good quality, that is, the printed characters are free of blurring and have clear outlines. In addition, the recording liquid should also have excellent storage stability. Therefore, usable solvents are severely restricted.

With respect to dyes for the recording liquid, on the other hand, they are required, for example, not only to have sufficient solubility in the restricted solvents as described above and be stable even in long-term storage of the recording liquid, but also to give printed images having a high density, excellent water and light resistance, etc. However, it has been difficult to satisfy these many requirements simultaneously.

Although various techniques (e.g., JP-A-61-101574, JP-A-61-101576, JP-A-61-195176, JP-A-61-62562, JP-A-61-247771, JP-A-62-156168, JP-A-63-63765, JP-A-63-295685, JP-A-1-123866, JP-A-2-16171, JP-A-3-122171, JP-A-3-203970, JP-A-4-15327, JP-A-4-279671, etc.) have hence been proposed, all these prior art techniques have failed to sufficiently meet the requirements of the market. (The term "JP-A" as used herein means an "unexamined published Japanese patent application".)

An object of the present invention is to provide a magenta recording liquid which, even when used in ink-jet recording, writing utensils, etc. to conduct recording on plain paper, is satisfactory in print quality and gives recorded images having high density and excellent in light resistance and especially in water resistance, and color tone, and which has satisfactory stability in long-term storage.

DISCLOSURE OF THE INVENTION

The present inventors have found that the above object is accomplished when a specific dye is used as a recording liquid component. The present invention has been achieved based on this finding. The essential aspects of the present invention reside in a recording liquid characterized by comprising an aqueous medium and at least one dye selected from dyes, the free acid forms of which are represented by general formula {I}:

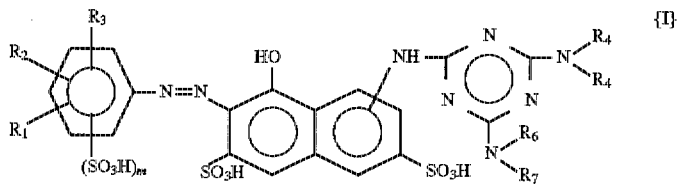

(wherein $R_1$, $R_2$, and $R_3$ each independently represents a substituted or unsubstituted alkyl group having 1 to 9 carbon atoms, an alkoxy group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic ester group, a sulfonyl group, a COOH group, or a carboxylic ester group; m represents a number of 0, 1, or 2; and $R_4$, $R_5$, $R_6$, and $R_7$ each independently represents a hydrogen atom, an alkyl group having 1 to 18 carbon atoms, an alkenyl group having 1 to 18 carbon atoms, an aryl group, an aralkyl group, an alicyclic group, or a heterocyclic group, and each may have a substituent when not representing a hydrogen atom, provided that at least one of $R_4$, $R_5$, $R_6$, and $R_7$ represents a group having a COOH group as a substituent).

BEST MODE FOR CARRYING OUT THE INVENTION

The present invention is explained below in detail.

The dye for use in the present invention is at least one monoazo dye, the free acid form of which is represented by general formula {I} described above.

Examples of $R_1$, $R_2$, and $R_3$, which each independently represents a substituent in general formula {I}, include substituted or unsubstituted alkyl groups having 1 to 9 carbon atoms (e.g., a methyl group, an ethyl group, an n-propyl group, an isopropyl group, an n-butyl group, a trifluoromethyl group, a dimethylaminomethyl group, etc.), alkoxy groups having 1 to 9 carbon atoms (e.g., a methoxy group, an isopropoxy group, an n-butoxy group, etc.), halogen atoms (e.g., a fluorine atom, a chlorine atom, a bromine atom, etc.), a hydrogen atom, a hydroxyl group, substituted or unsubstituted carbamoyl groups (e.g., a carbamoyl group, an N,N-dimethylcarbamoyl group, a phenylcarbamoyl group, etc.), substituted or unsubstituted sulfamoyl groups (e.g., a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group, etc.), substituted or unsubstituted amino groups (e.g., an N-methylamino group, a carbamoylamino group, an N,N-diethylamino group, an acetylamino group, etc.), a nitro group, sulfonic ester groups (e.g., a phenoxysulfonyl group, etc.), sulfonyl groups (e.g., a hydroxyethylsulfonyl group, a benzylsulfonyl group, etc.), a COOH group, and carboxylic ester groups (e.g., a methoxycarbonyl group, etc.).

Symbol m represents 0, 1, or 2. Examples of $R_4$, $R_5$, $R_6$, and $R_7$, which each independently represents a substituent, include a hydrogen atom, substituted or unsubstituted alkyl groups having 1 to 18 carbon atoms (e.g., an ethyl group, an n-butyl group, an n-octyl group, an ethylhexyl group, a hydroxyethyl group, carboxylated alkyl groups such as a carboxypropyl group, a carboxycyclohexylmethyl group, a 1-carboxy-2-mercaptoethyl group, a 1-carboxy-2-carbamoylethyl group, a 1-isopropyl-1-carboxymethyl group, and a 1,2-dicarboxypropyl group, etc.), substituted or unsubstituted alkenyl groups having 1 to 18 carbon atoms (e.g., a 2-methyl-1-propenyl group, a vinyl group, an allyl group, etc.), substituted or unsubstituted aryl groups (e.g., a 3,4-dicarboxyphenyl group, a 4-butylphenyl group, a 4-carboxyphenyl group, etc.), substituted or unsubstituted aralkyl groups (e.g., a benzyl group, a 1-carboxy-2-phenylethyl group, a 1-carboxy-2-hydroxyphenylethyl group, a 4-carboxybenzyl group, etc.), substituted or unsubstituted alicyclic groups (e.g., a cyclohexyl group, a 4-carboxycyclohexyl group, etc.), and substituted or unsubstituted heterocyclic groups (e.g., a pyridyl group, a thiadiazolyl group, a benzothiazolyl group, a 2,2,6,6-tetramethylpiperidinyl group, etc.). However, at least one of $R_4$, $R_5$, $R_6$, and $R_7$ represents a group having a COOH group (carboxyl group) as a substituent.

In the present invention, in general formula {I}, a group represented by general formula {II}:

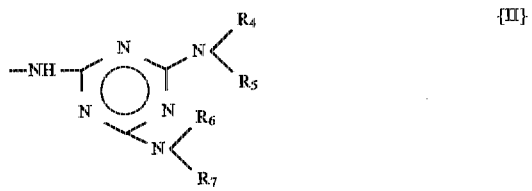

(wherein $R_4$, $R_5$, $R_6$, and $R_7$ each has the same meaning as in general formula {I}) is preferably bonded to the 8-position of the 1-naphthol ring.

Further, at least one of $R_4$, $R_5$, $R_6$, and $R_7$ in general formula {I} is preferably a hydrogen atom. In one embodiment of the present invention, either of $R_4$ and $R_5$ and either of $R_6$ and $R_7$ in general formula {I} are hydrogen atoms. In another embodiment, either $R_4$ and $R_5$ or $R_6$ and $R_7$ in general formula {I} are hydrogen atoms. Further, in general formula {I}, at least one of $R_4$, $R_5$, $R_6$, and $R_7$ is preferably an alkyl group having 1 to 18 carbon atoms, an alkenyl group having 1 to 18 carbon atoms, an aryl group, an aralkyl group, or a cyclohexyl group, each of which is substituted with from 1 to 4 COOH group. In one embodiment of the present invention, either of $R_4$ and $R_5$ and either of $R_6$ and $R_7$ in general formula {I} are preferably groups having a COOH group as a substituent. Moreover, in another embodiment of the present invention, at least one of $R_4$, $R_5$, $R_6$, and $R_7$ in general formula {I} is a phenyl group having a COOH group as a substituent.

Furthermore, a dye represented by general formula {I} in which m is 0 is preferred. Also preferred is a dye represented by general formula {I} in which m is 1.

In general formula {I}, at least one of $R_1$, $R_2$, and $R_3$ is preferably a hydrogen atom. Further, any one or two of $R_1$, $R_2$, $R_3$ in general formula {I} are preferably COOH groups.

In the present invention, the most preferred recording liquid contains at least one dye selected from dyes, the free acid forms of which are represented by general formula {III}:

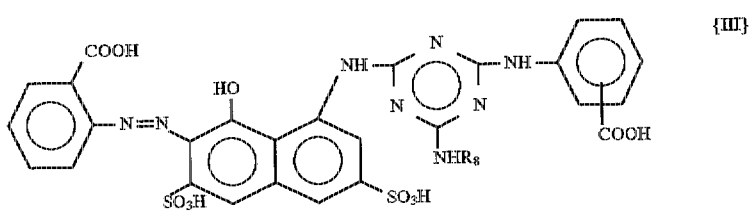

(wherein $R_8$ represents a hydrogen atom, an alkyl group having 1 to 9 carbon atoms and optionally substituted with a hydroxy group or a COOH group, a cycloalkyl group, or an aralkyl group).

The dye for use in the present invention may be used either in the free acid form represented by general formula {I} or in the form of a salt. Examples of such salt forms include salts of alkali metals, e.g., Na, Li, and K, salts of ammonium optionally substituted with an alkyl or hydroxyalkyl group, and salts of organic amines. Examples of the organic amines include lower alkylamines, hydroxy-substituted lower alkylamines, carboxy-substituted lower alkylamines, and polyamines having 2 to 10 alkyleneimine units having 2 to 4 carbon atoms. In the case of these salt forms, they are not limited to one kind, and two or more kinds of salt forms may coexist.

In the case where the dye for use in the present invention has a structure containing two or more acid groups per molecule, these acid groups, which are in a salt form or a free acid form, may be the same or different. Further, a salt-form dye may coexist with a dye in a free acid form.

Specific examples of these dyes include the dyes having structures Nos. (1) to (63) shown below.

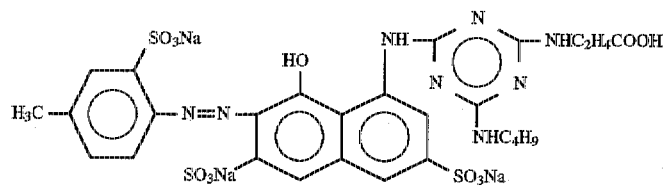 (1)
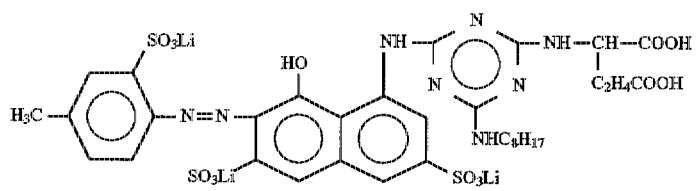 (2)
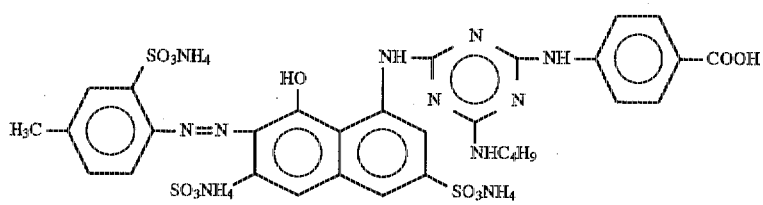 (3)
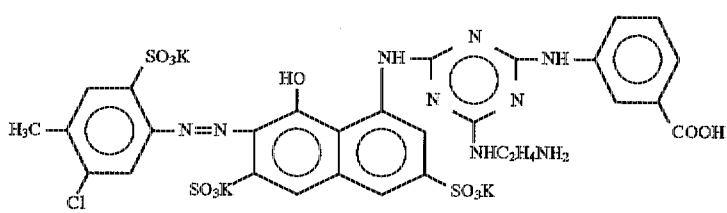 (4)
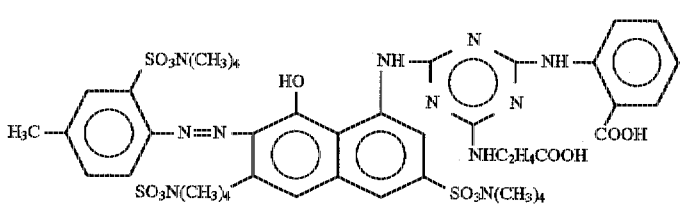 (5)
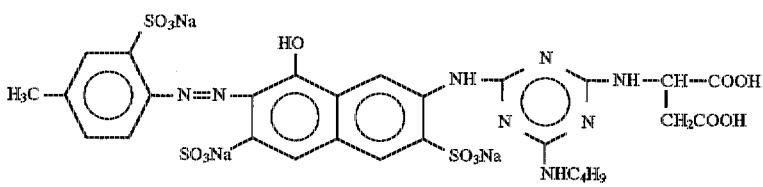 (6)
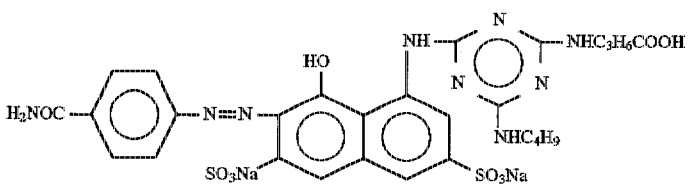 (7)
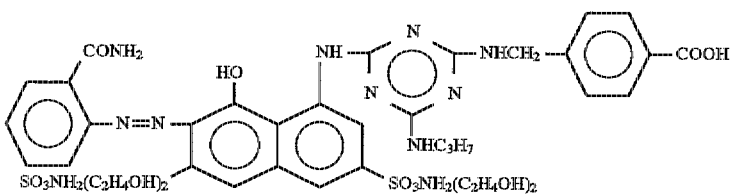 (8)

-continued
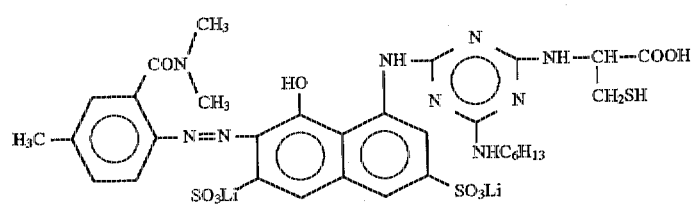
(9)
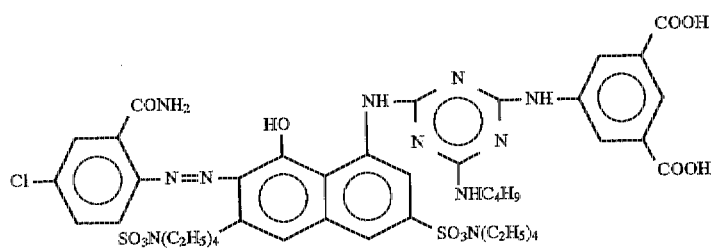
(10)
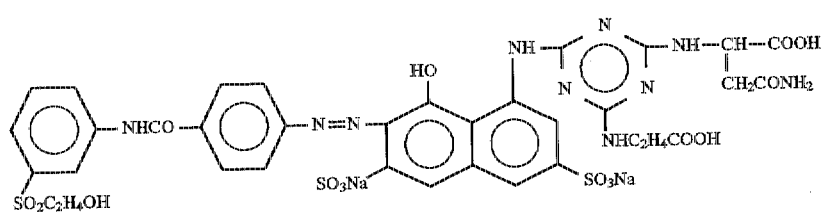
(11)
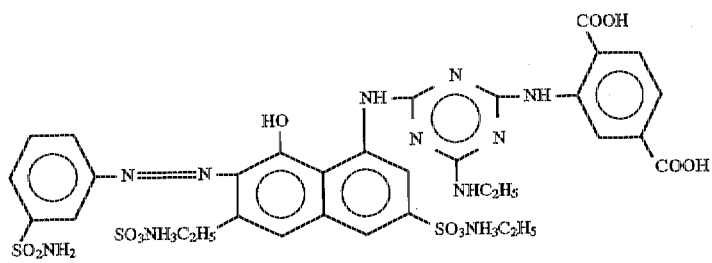
(12)
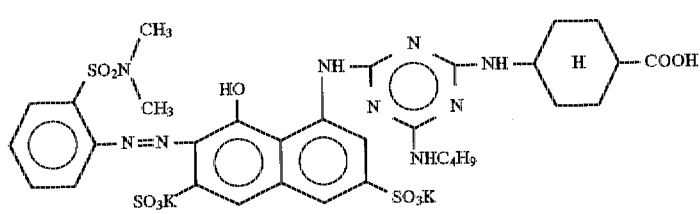
(13)
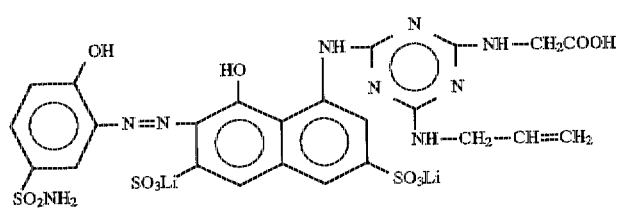
(14)
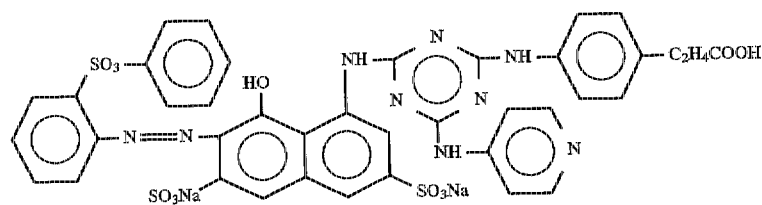
(15)

-continued
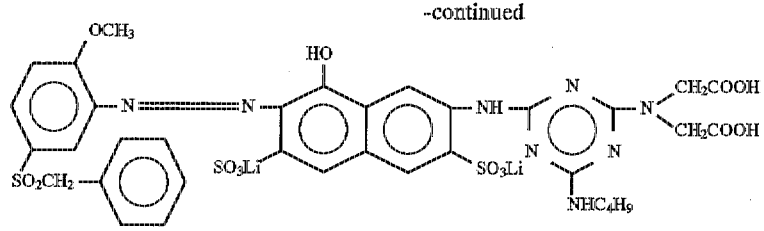
(16)
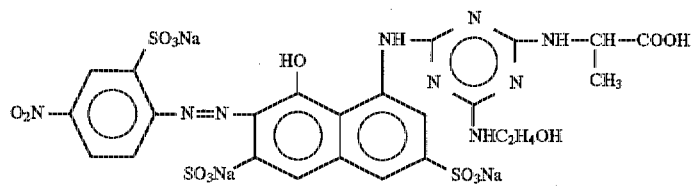
(17)
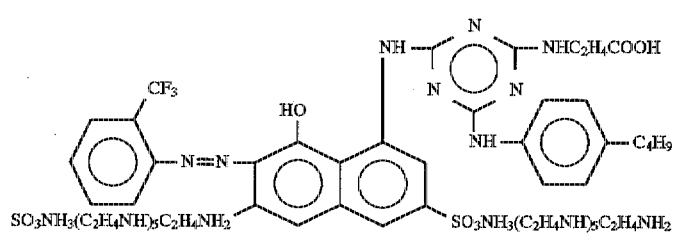
(18)
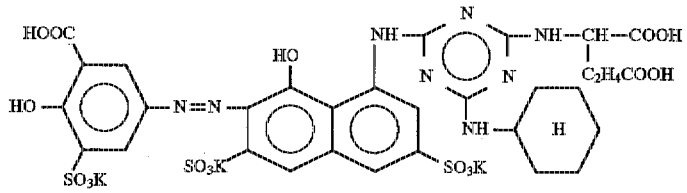
(19)
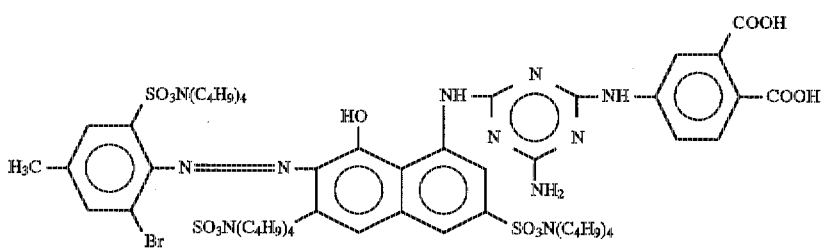
(20)
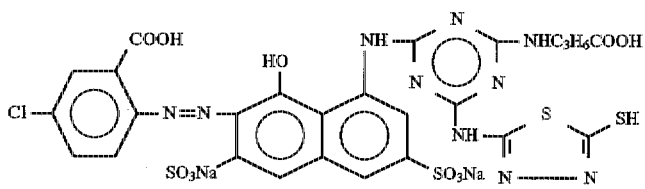
(21)
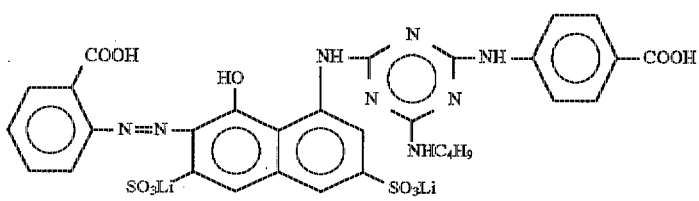
(22)
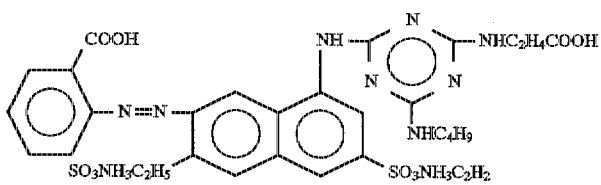
(23)

-continued
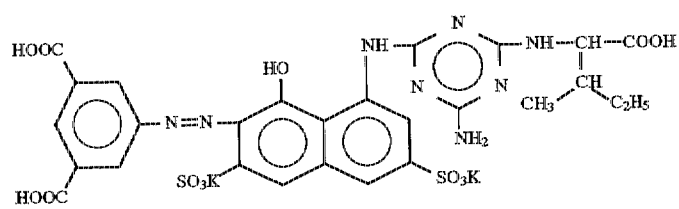
(24)
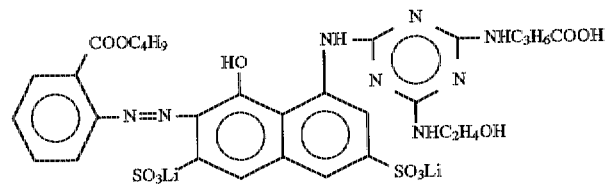
(25)
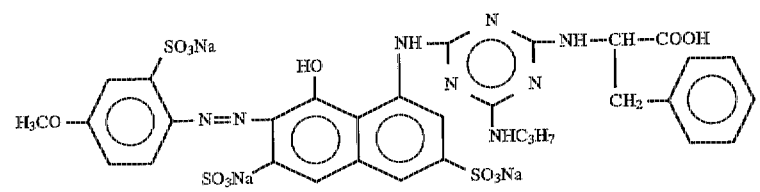
(26)
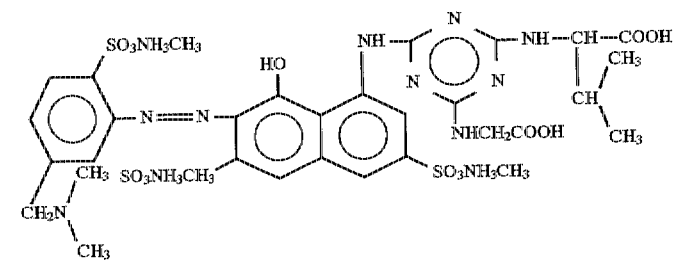
(27)
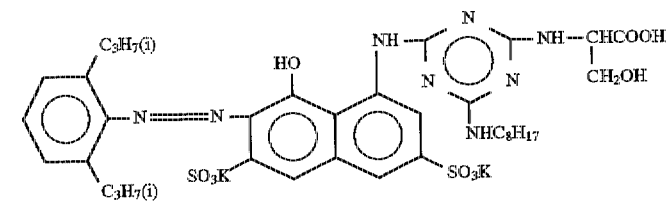
(28)
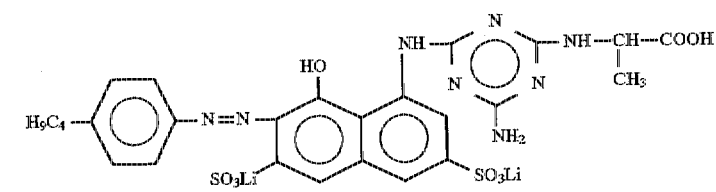
(29)
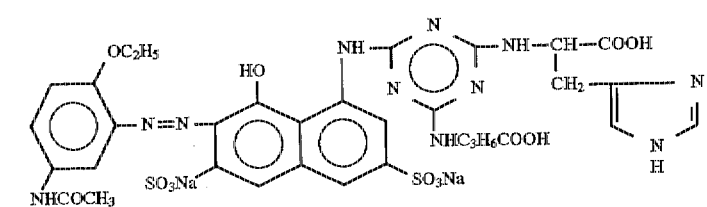
(30)
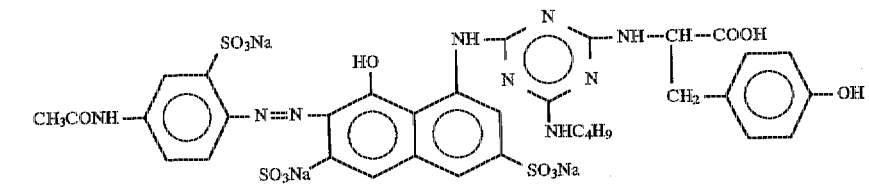
(31)

-continued
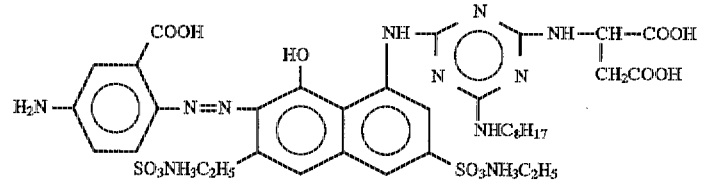
(32)
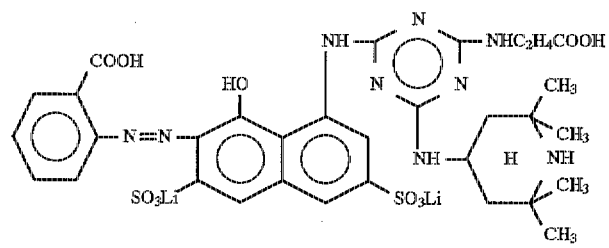
(33)
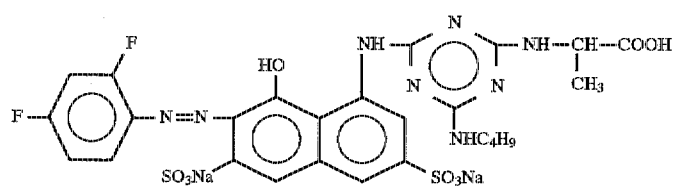
(34)
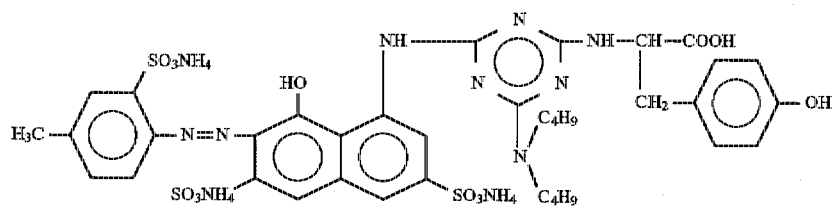
(35)
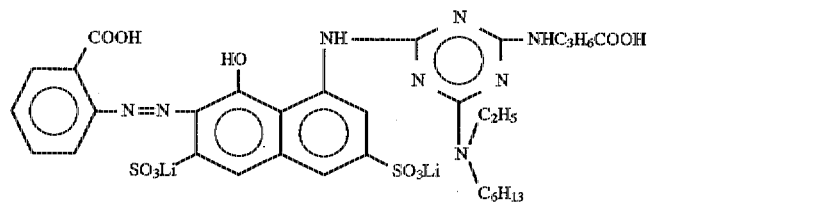
(36)
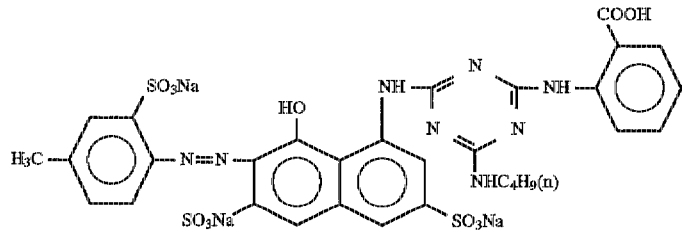
(37)
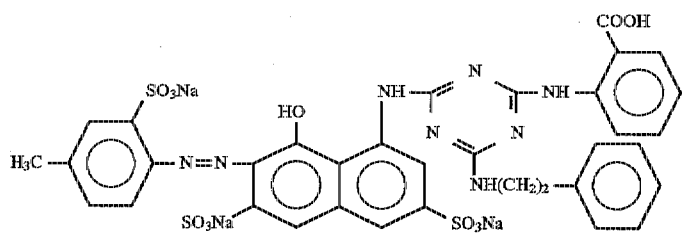
(38)

-continued
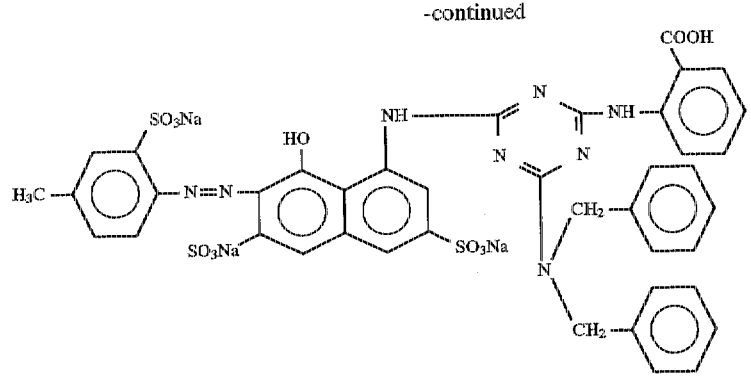
(39)
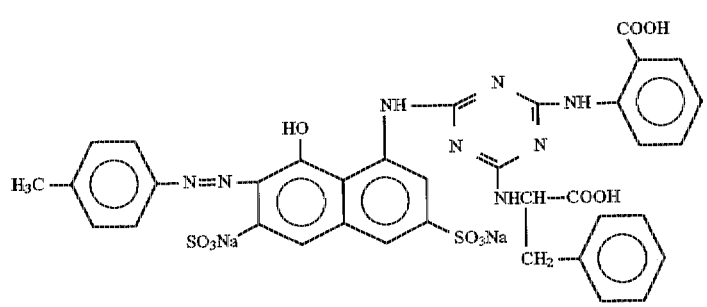
(40)
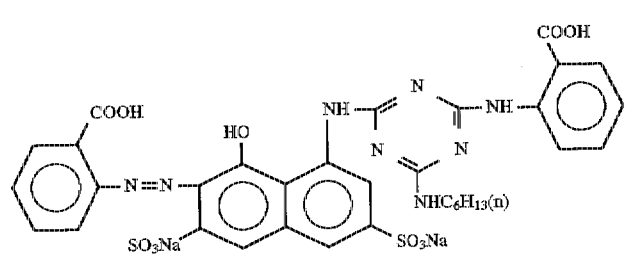
(41)
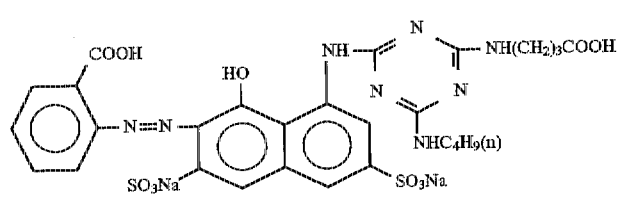
(42)
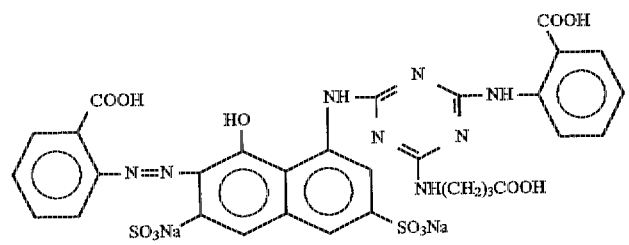
(43)
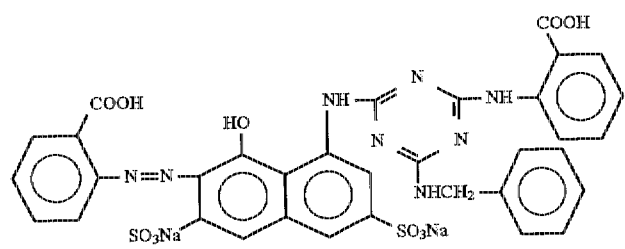
(44)

-continued
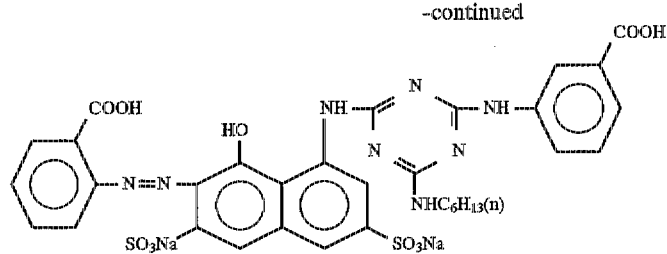
(45)
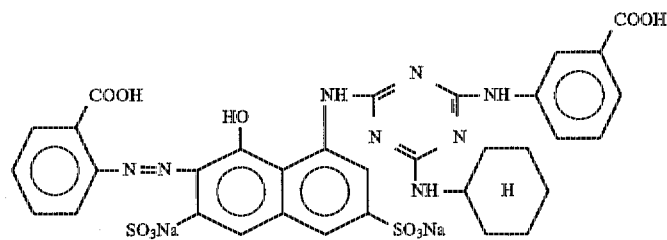
(46)
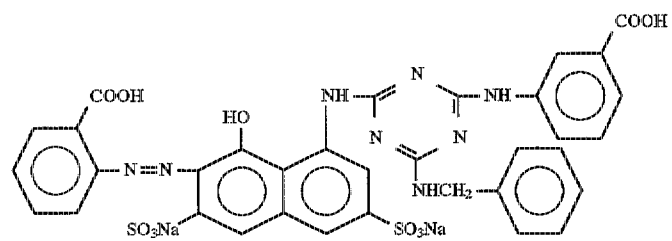
(47)
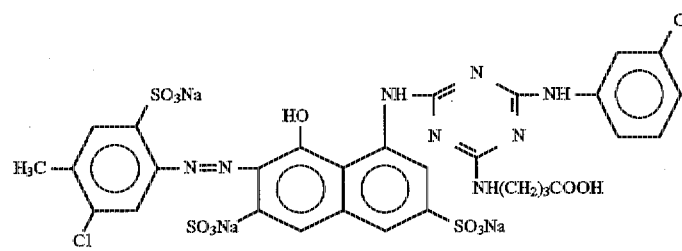
(48)
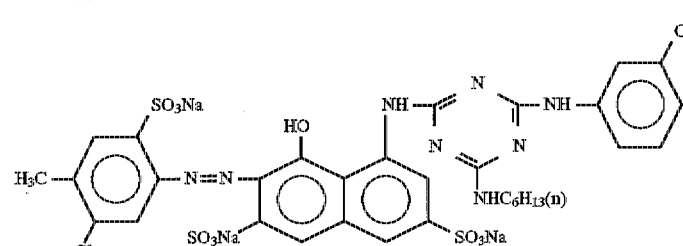
(49)
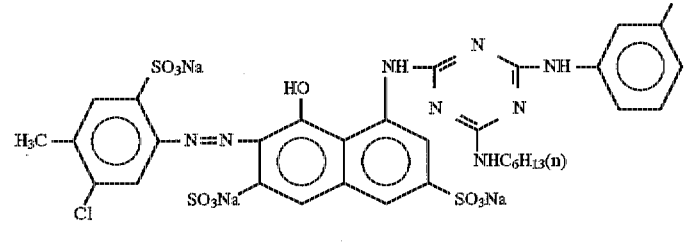
(50)
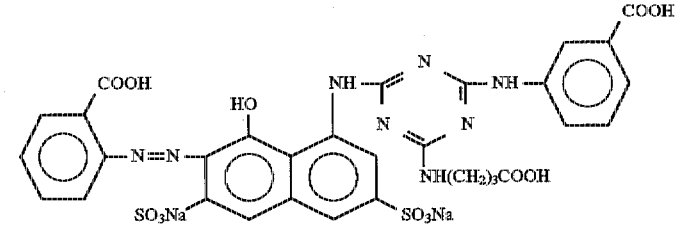
(51)

-continued
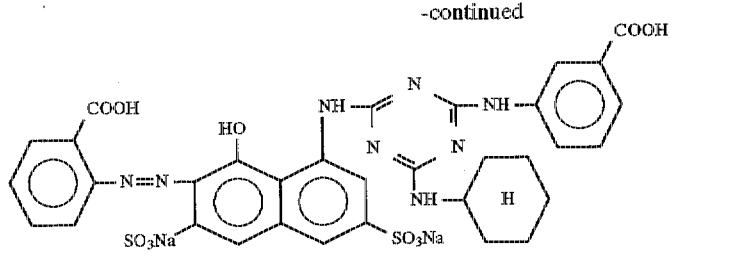
(52)
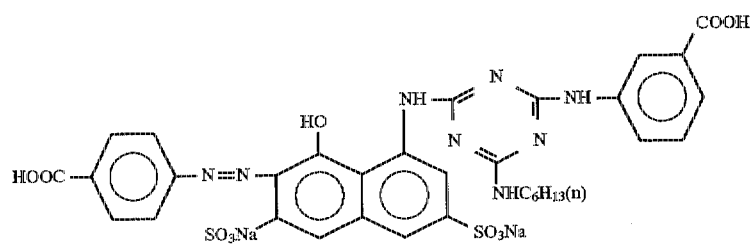
(53)
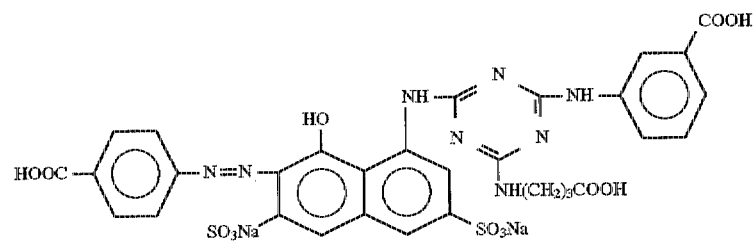
(54)
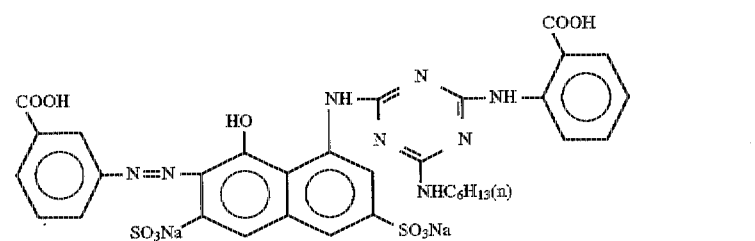
(55)
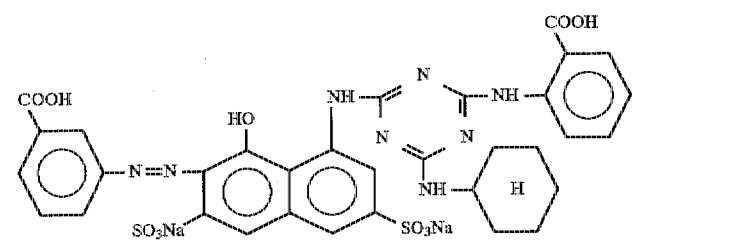
(56)
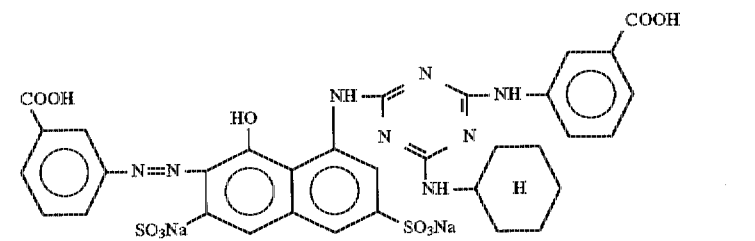
(57)
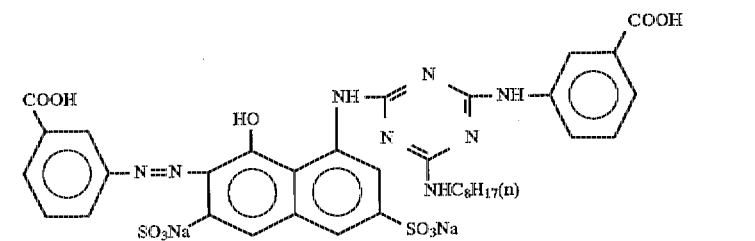
(58)

-continued

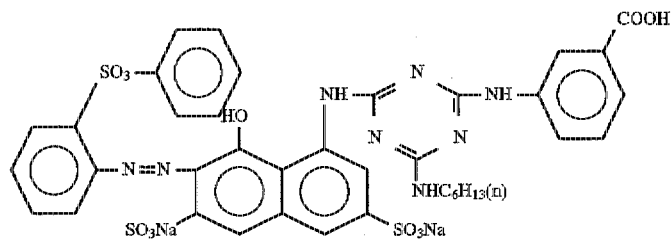

(59)

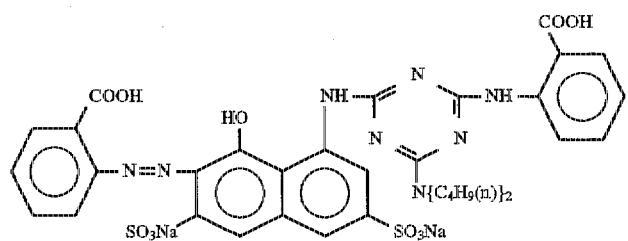

(60)

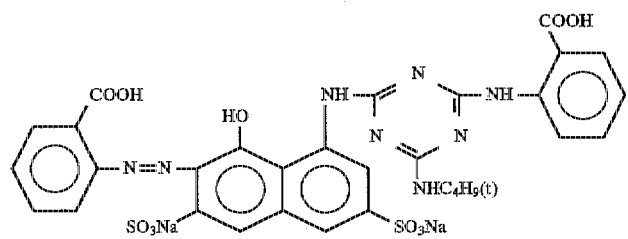

(61)

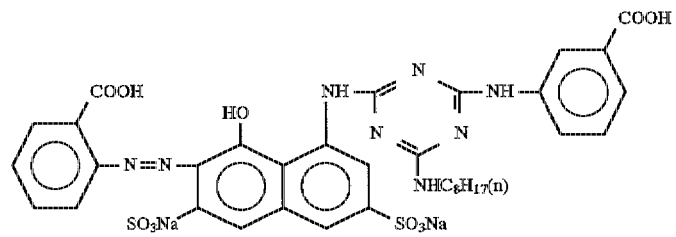

(62)

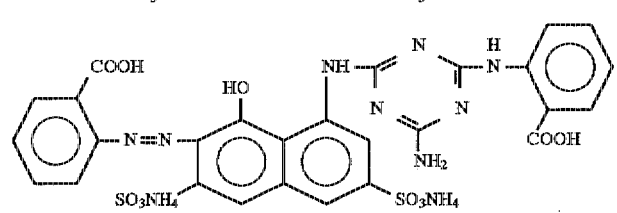

(63)

In the above formulae, (n) indicates that the alkyl group is a normal alkyl group, (i) indicates that the alkyl group is an isoalkyl group, and (t) indicates that the alkyl group is a tertiary alkyl group.

The azo dyes represented by general formula {I} can be produced by known methods. For example, dye No. (1) can be produced through the following steps (A) to (C).

(A) A monoazo compound is produced from 4-aminotoluene-3-sulfonic acid and 1-amino-8-hydroxy-3, 6-naphthalenedisulfonic acid (H-acid) through diazotization and coupling according to a conventional method (see, e.g., *Shin Senryo Kagaku* (New Dye Chemistry) written by Yutaka Hosoda (published by Gihodo on Dec. 21, Showa-48 (1973)) pp. 396–409).

(B) The monoazo compound obtained is added to a suspension of cyanuric chloride while maintaining at a pH of 4 to 6 and a temperature of 0° to 5° C. and reaction is conducted for several hours. Subsequently, an aqueous β-alanine solution is added thereto to conduct condensation reaction at room temperature for several hours while regulating the reaction mixture so as not to become alkaline. An n-butylamine solution is then added at 50° to 60° C., and condensation reaction is conducted for several hours to complete the reaction.

(C) After cooling, the resulting reaction mixture is subjected to salting-out with 20% aqueous sodium chloride solution to obtain the desired dye No. (1).

The content of the dye of general formula {I} or general formula {III} in the recording liquid is preferably about from 0.5 to 5% by weight, especially about from 2 to 4% by weight, based on the total amount of the recording liquid.

The aqueous medium for use in the present invention preferably comprises water and a water-soluble organic solvent such as ethylene glycol, propylene glycol, butylene glycol, diethylene glycol, triethylene glycol, polyethylene glycol having a molecular weight of from 190 to 400, glycerol, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol, isopropanol, etc. These water-soluble organic solvents are generally used in an amount of from 1 to 50% by weight based on the total amount of the recording liquid, while water is used in an amount of from 45 to 95% by weight based on the total amount of the recording liquid.

The property of quick drying after printing and print quality can be improved further by adding a compound selected from urea, thiourea, biuret, and semicarbazide to the recording liquid of the present invention in an amount of from 0.1 to 10% by weight, preferably from 0.5 to 5% by weight, based on the total amount of the recording liquid, or by adding a surfactant to the recording liquid in an amount of from 0.001 to 5.0% by weight based on the total amount of the recording liquid.

The recording liquid of the present invention is suitable for providing red recording liquids. In particular, the recording liquid is suitable for use as a magenta recording liquid for full-color printing, in which the use of the magenta recording liquid in combination with yellow and cyan recording liquids and, if desired, further with a black recording liquid can give a satisfactory full-color print. In the recording liquid of the present invention, the dye represented by general formula {I} or general formula {III} may be contained in combination with dyes of other structures. Usable other dyes include dyes having similar color tones and dyes having other color tones for toning to a desired color tone.

The recording liquid of the present invention can be used as an ink for writing utensils, printing, etc., and is especially suitable for the so-called ink-jet recording in which an ink is ejected or jetted as droplets from the minute orifices of a recording apparatus. Methods for generating droplets for ink-jet recording include a technique in which electrical signals sent from a piezoelectric element or the like are used to generate ink droplets, a technique in which bubbles are formed in an ink by means of, e.g., thermal energy by a thermal head to generate ink droplets, etc.

Further, the recording liquid of the present invention can be printed on various kinds of papers, etc. as recording materials. Even when the recording liquid is printed on plain paper, in particular on neutral paper, it gives a print with satisfactory water resistance.

EXAMPLES

The present invention will be explained below in more detail by reference to Examples, but the invention should not be construed as being limited thereto as long as it is within the spirit thereof.

(EXAMPLE 1)

Water was added to a mixture of 10 parts by weight of diethylene glycol, 3 parts by weight of isopropyl alcohol, and 3 parts by weight of dye No. (1) specified hereinabove, and the pH thereof was adjusted to 9 with ammonia water. Thus, the total amount of the resulting composition was regulated to 100 parts by weight. This composition was sufficiently mixed to dissolve the dye, filtered under pressure through a Teflon filter having a pore diameter of 1 μm, and then degassed with a vacuum pump and an ultrasonic cleaning machine to prepare a recording liquid.

Using the recording liquid obtained, ink-jet recording was conducted on paper for electrophotography (neutral paper; manufactured by Xerox Co.) with an ink-jet printer (trade name HG-3000, manufactured by Epson Co.) to obtain a print bearing characters of a high-density magenta color. The print was evaluated according to the following methods (a), (b), and (c), and the results obtained are shown.

(a) Light Resistance of Recorded Image

Using a xenon fademeter (manufactured by Suga Shikenki K.K.), the recording paper was irradiated for 100 hours. As a result, the discoloration or fading caused by the irradiation was little.

(b) Water Resistance of Recorded Image

Water Resistant Test (1) Test Method

The recorded image was immersed in tap water for 5 minutes and then (i) the recorded image was visually examined for image blurring; and (ii) the OD value of a solid print part was measured with a Macbeth densitometer (TR927) before and after the immersion.

(2) Test Results

The image blurring in test (i) was slight.

The density change of the solid print part through immersion in test (ii) was 84.7% in terms of the percentage of residual OD, which was calculated using the following equation.

$$\text{Percentage of residual } OD = \frac{OD \text{ value after immersion}}{OD \text{ value before immersion}} \times 100(\%)$$

(c) Storage Stability of the Recording Liquid

The recording liquid was placed in sealed Teflon containers, and stored for 1 month at 5° C. and 60° C. Thereafter, the recording liquid was examined for any change. As a result, precipitation of an insoluble matter was not observed.

(EXAMPLE 2)

Water was added to a mixture of 5 parts by weight of glycerol, 10 parts by weight of ethylene glycol, and 25 parts by weight of dye No. (8) specified hereinabove, and the pH thereof was adjusted to 9 with ammonia water. Thus, the total amount of the resulting composition was regulated to 100 parts by weight. This composition was treated by the method described in Example 1 to prepare a recording liquid. This recording liquid was used to conduct printing in the same manner as in Example 1 to obtain a print bearing characters of a high-density magenta color. This print was evaluated for properties (a) to (c) given in Example 1. As a result, satisfactory results were obtained in all the evaluations as in Example 1.

The percentage of residual OD was 86.5%.

(EXAMPLE 3)

Water was added to a mixture of 10 parts by weight of diethylene glycol, 5 parts by weight of N-methylpyrrolidone, 3 parts by weight of isopropyl alcohol, and 3 parts by weight of dye No. (24) specified hereinabove, and the pH thereof was adjusted to 9 with ammonia water. Thus, the total amount of the resulting composition was regulated to 100 parts by weight. This composition was treated by the method described in Example 1 to prepare a recording liquid. This recording liquid was used to conduct printing in the same manner as in Example 1 to obtain a print bearing characters of a high-density magenta color. This print was evaluated for properties (a) to (c) given in Example 1. As a result, satisfactory results were obtained in all the evaluations as in Example 1.

The percentage of residual OD was 85.2%.

(EXAMPLES 4 TO 34)

Recording liquids were prepared and subjected to printing in the same manner as in Example 1, except that each of dyes Nos. (2) to (7), Nos. (9) to (23), and Nos. (25) to (34) each specified hereinabove was used in place of dye No. (1) specified hereinabove. These prints were evaluated for properties (a) to (c) given in Example 1. As a result, each print gave satisfactory results as in Example 1. The percentage of residual OD for the recording liquid using dye No. (2) was 86.3%, and that for the recording liquid using dye No. (3) was 88.4%.

(EXAMPLES 35 TO 41)

Water was added to a mixture of 12 parts by weight of thiodiglycol, 4 parts by weight of N-methyl-2-pyrrolidone, 3 parts by weight of 2-propanol, and 3 parts by weight of dye No. (41), (43), (44), (45), (46), (47), or (62) specified hereinabove, and the pH thereof was adjusted to 9 with ammonia water. Thus, the total amount of the resulting composition was regulated to 100 parts by weight. This composition was sufficiently mixed to dissolve the dye, filtered under pressure through a Teflon filter having a pore diameter of 1 μm, and then degassed with a vacuum pump and an ultrasonic cleaning machine to prepare a recording liquid.

Using the recording liquid obtained, ink-jet recording was conducted on paper for electrophotography (neutral paper; manufactured by Xerox Co.) with an ink-jet printer (trade name HG-3000, manufactured by Epson Co.) to obtain a print bearing characters of a high-density magenta color. The print was evaluated by the following methods (a), (b), (c), and (d), and the results obtained are shown in Table 1 given later.

(a) Property of the Recording Liquid (Solubility of dye)

The recording liquid was filtered through a 0.45-μm Teflon filter, and the presence or absence of a filtration residue was visually judged. Thus, the solubility of the dye was judged.

Symbol ⊙ in the table indicates that the solubility of the dye was visually judged excellent.

(b) Color Tone of Recorded Image

The recording liquid is used to conduct solid printing with the printer shown above, and the color tone of the solid print part is determined with a color difference meter (product of Nippon Denshoku K.K.).

(c) Density of Recorded Image

The recording liquid is used to conduct solid printing with the printer shown above, and the color density of the solid print part is measured with a microdensitometer (Macbeth TR927).

(d) Water Resistance of Recorded Image (i) 5-Minute Immersion Test

The recording liquid was used to conduct solid printing with the printer shown above. A test piece was allowed to stand at ordinary temperature and ordinary humidity for one day, and then immersed in still tap water for 5 minutes. The percentage of residual OD was determined from the OD values before and after the test using the following equation.

$$\text{Percentage of residual } OD = \frac{OD \text{ value after immersion}}{OD \text{ value before immersion}} \times 100(\%)$$

(ii) 5-Second Immersion Test (background fouling):

The recording liquid was used to conduct printing with the printer shown above. A test piece was allowed to stand at ordinary temperature and ordinary humidity for one day, and then immersed in still tap water for 5 seconds. Thereafter, the degree of background fouling is visually judged.

Symbol ⊙ in the table indicates that the image blurring, color density change, and color tone change were visually judged extremely slight, while ○ indicates that these properties were visually judged almost satisfactory for practical use, although slightly inferior to ⊙.

TABLE 1

| Dye (No.) | Solubility | Color tone (L*, a*, b*) | Printing density (DC value) | 5-Minute immersion | 5-Second immersion |
|---|---|---|---|---|---|
| (41) | ⊙ | 49.94, 61.89, −0.74 | 1.233 | 86.8 | ⊙ |
| (43) | ⊙ | 49.65, 64.83, 1.56 | 1.283 | 71.2 | ○ |
| (44) | ⊙ | 49.39, 63.41, 1.74 | 1.247 | 85.6 | ⊙ |
| (45) | ⊙ | 48.19, 61.76, 0.89 | 1.310 | 89.1 | ⊙ |
| (46) | ⊙ | 47.5, 61.6, 1.5 | 1.310 | 86.3 | ⊙ |
| (47) | ⊙ | 48.00, 61.61, 2.08 | 1.300 | 84.6 | ○ |
| (62) | ⊙ | 47.87, 60.74, −0.04 | 1.267 | 93.7 | ⊙ |

(EXAMPLE 42)

A recording liquid was prepared and subjected to printing in the same manner as in Example 1, except that dye No. (63) specified hereinabove was used in place of dye No. (1) specified hereinabove. This print was evaluated for properties (a) to (c) given in Example 1. As a result, satisfactory results were obtained in all the evaluations as in Example 1. The percentage of residual OD was 59.0%.

POSSIBILITY OF INDUSTRIAL APPLICATION

The recording liquid of the present invention is used for ink-jet recording and in writing utensils, and when used in recording on plain paper, it can give a print of a magenta color which is excellent in printing density, light resistance, and water resistance. In addition, the recording liquid has satisfactory storage stability.

We claim:

1. An ink-jet recording liquid comprising an aqueous medium and at least one dye selected from the group consisting of dyes, the free acid forms of which are represented by general formula {I}:

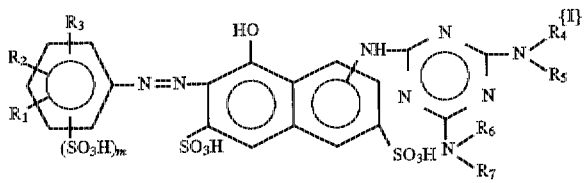

wherein $R_1$, $R_2$, and $R_3$ each independently represents a substituted or unsubstituted alkyl group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic ester group, a sulfonyl group, a COOH group, or a carboxylic ester group;

m represents a number of 0, 1, or 2; and $R_4$, $R_5$, $R_6$, and $R_7$ each independently represents a hydrogen atom, an alkyl group having 1 to 18 carbon atoms, an alkenyl group having 1 to 18 carbon atoms, an aryl group, an aralkyl group, an alicyclic group, or a heterocyclic group, and each may have a substituent when not representing a hydrogen atom, provided that at least one of $R_4$, $R_5$, $R_6$, and $R_7$ represents a group having a COOH group as a substituent;

wherein the at least one dye is suitable for ink-jet recording.

2. An ink jet recording liquid as claimed in claim 1, wherein in general formula {I}, a group represented by general formula {II}:

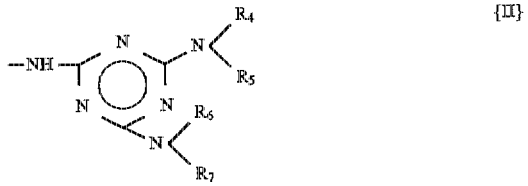

(wherein $R_4$, $R_5$, $R_6$, and $R_7$ each has the same meaning as in general formula {I}) is bonded to the 8-position of the 1-naphthol ring.

3. An ink jet recording liquid as claimed in claim 1, wherein in general formula {I}, at least one of $R_4$, $R_5$, $R_6$, and $R_7$ is a hydrogen atom.

4. An ink jet recording liquid as claimed in claim 1, wherein in general formula {I}, either of $R_4$ and $R_5$ and either of $R_6$ and $R_7$ are hydrogen atoms.

5. An ink jet recording liquid as claimed in claim 1, wherein in general formula {I}, either $R_4$ and $R_5$ or $R_6$ and $R_7$ are hydrogen atoms.

6. An ink jet recording liquid as claimed in claim 1, wherein in general formula {I}, m is 0.

7. An ink jet recording liquid as claimed in claim 1, wherein in general formula {I}, m is 1.

8. An ink jet recording liquid as claimed in claim 1, wherein in general formula {I}, at least one of $R_1$, $R_2$, and $R_3$ is a hydrogen atom.

9. An ink jet recording liquid as claimed in claim 1, wherein in general formula {I}, any one or two of $R_1$, $R_2$, and $R_3$ are COOH groups.

10. An ink jet recording liquid as claimed in claim 1, wherein in general formula {I}, at least one of $R_4$, $R_5$, $R_6$ and $R_7$ is an alkyl group having 1 to 18 carbon atoms, an alkenyl group having 1 to 18 carbon atoms, an aryl group, an aralkyl group, or a cyclohexyl group, each of which is substituted with from 1 to 4 COOH groups.

11. An ink jet recording liquid as claimed in claim 1, wherein in general formula {I}, either of $R_4$ and $R_5$ and either of $R_6$ and $R_7$ are groups having a COOH group as a substituent.

12. An ink jet recording liquid as claimed in claim 1, wherein in general formula {I}, at least one of $R_4$, $R_5$, $R_6$, and $R_7$ is a phenyl group having a COOH group as a substituent.

13. An ink-jet recording liquid comprising an aqueous medium and at least one dye selected from the group consisting of dyes, the free acid forms of which are represented by general formula {III}:

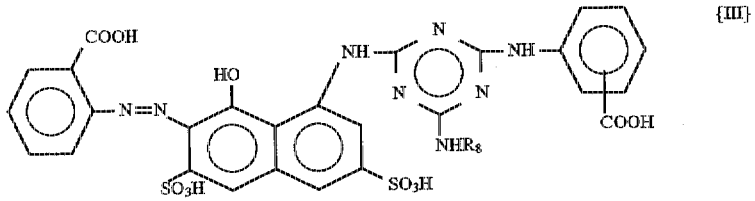

wherein $R_8$ represents a hydrogen atom, an alkyl group having 1 to 9 carbon atoms and optionally substituted with a hydroxy group or a COOH group, a cycloalkyl group, or an aralkyl group;

wherein the at least one dye is suitable for ink-jet recording.

14. An ink jet recording liquid as claimed in claim 1 or 13, wherein the content of the dye of general formula {I} or {III} is from 0.5 to 5% by weight based on the total amount of the recording liquid.

15. An ink-jet recording liquid as claimed in claim 1 or 13, wherein said aqueous medium comprises water and at least one water-soluble organic solvent selected from the group consisting of ethylene glycol, propylene glycol, butylene glycol, diethylene glycol, triethylene glycol, polyethylene glycol having a molecular weight of 190 to 400, glycerol, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol, and isopropanol.

16. An ink jet recording liquid as claimed in claim 15, wherein the content of said water-soluble organic solvent is from 1 to 50% by weight based on the total amount of said recording liquid.

17. An ink-jet recording liquid as claimed in claim 1, wherein in general formula {I}, m=0 and at least one of $R_4$, $R_5$, $R_6$ and $R_7$ is a phenyl group having a COOH group as a substituent.

* * * * *